April 24, 1962  J. B. HAYES  3,030,758
HARVESTER REEL MOUNTING AND ADJUSTING MECHANISM
Filed Feb. 16, 1960  2 Sheets-Sheet 1

INVENTOR.
JOHN B. HAYES

April 24, 1962 J. B. HAYES 3,030,758
HARVESTER REEL MOUNTING AND ADJUSTING MECHANISM
Filed Feb. 16, 1960 2 Sheets-Sheet 2
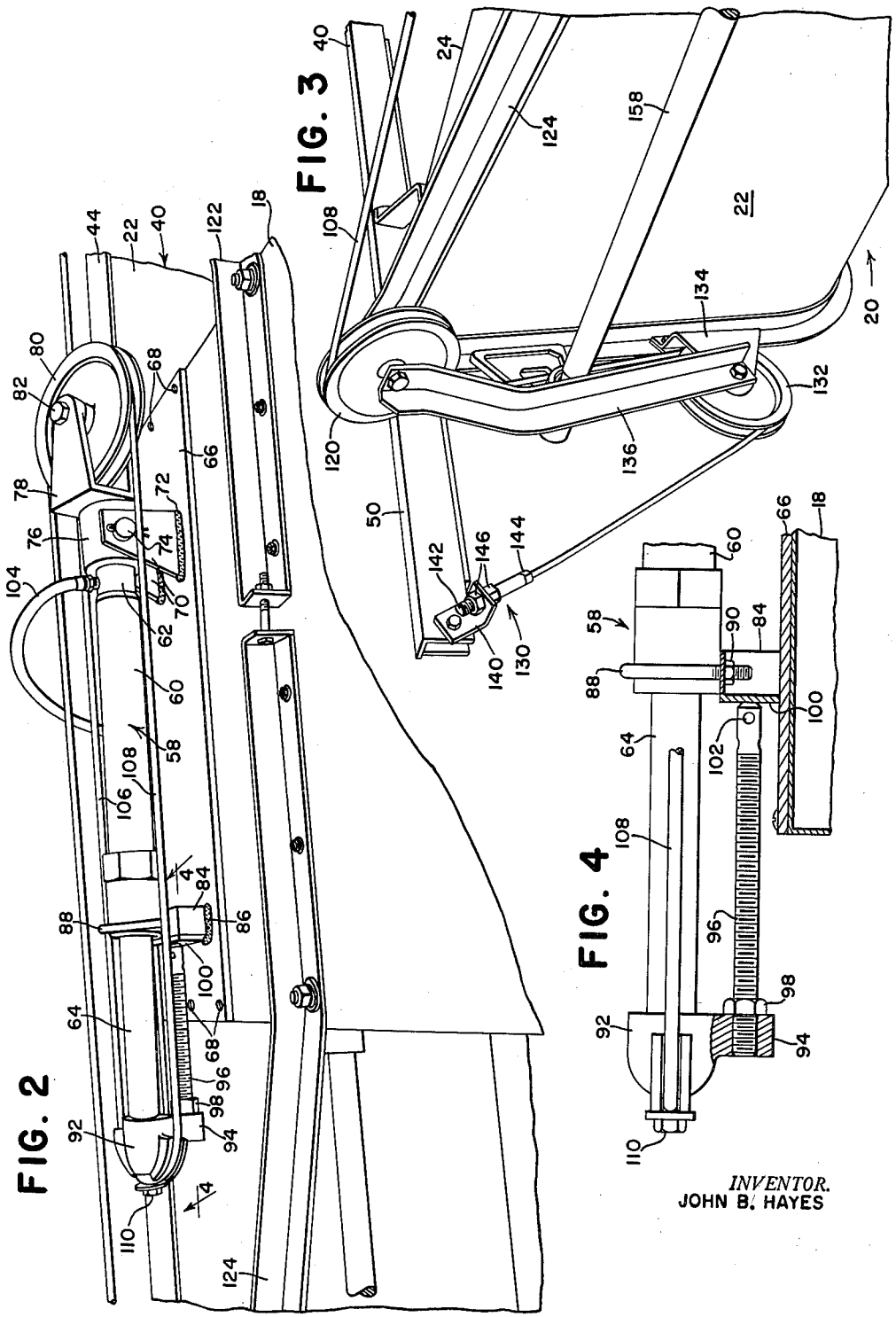
INVENTOR.
JOHN B. HAYES

United States Patent Office 3,030,758
Patented Apr. 24, 1962

3,030,758
HARVESTER REEL MOUNTING AND ADJUSTING MECHANISM
John B. Hayes, Milan, Ill., assignor to Deere & Company, Moline, Ill., a corporation of Delaware
Filed Feb. 16, 1960, Ser. No. 8,943
11 Claims. (Cl. 56—222)

This invention relates to a harvester and more particularly to means for mounting and adjusting a harvester reel.

In a typical harvester, particularly of the combine type, a mobile frame supports a fore-and-aft body from which a feeder house extends forwardly to support a transverse header which in turn has rotatably mounted thereover on a transverse axis a reel for cooperation with the cutting mechanism of the header. As crop conditions vary, the height of the reel relative to the cutting mechanism must be adjusted and, although various means have been tried to accomplish the adjusting mechanism, there is still room for improvement. According to the present invention, an improved adjusting mechanism is provided which utilizes a fluid motor in combination with a pair of flexible elements, such as cables or the like, in association with appropriate sheaves and equivalent guide means for accomplishing an equalized vertical adjustment of the reel.

It is, accordingly, an important object of the invention to provide an improved reel mounting and adjusting means of the character noted above. It is a significant object of the invention to provide a reel adjusting mechanism which may be readily mounted on supporting structure of machines already in existence. Further objects of the invention reside in improved mounting of the fluid motor, improved adjusting means for limiting the stroke of the motor in at least one direction, and improved means for independently adjusting the connections of the two cables to the two reel supports whereby the leveling of the reel may be accomplished.

The foregoing and other important objects and desirable features inherent in and encompassed by the invention will become apparent as a preferred embodiment of the invention is disclosed, by way of example, in the ensuing description and accompanying sheets of drawings, the several figures of which are described below.

FIG. 2 is a fragmentary perspective, on a scale enlarged over that of FIG. 1, and showing the fluid motor, as seen from the rear of the position of the motor in FIG. 1.

FIG. 3 is an enlarged fragmentary perspective of one end of the header, illustrating the guide and mounting means for one of the adjusting cables.

FIG. 4 is an enlarged fragmentary sectional view as seen generally along the line 4—4 of FIG. 2.

Figure 1:
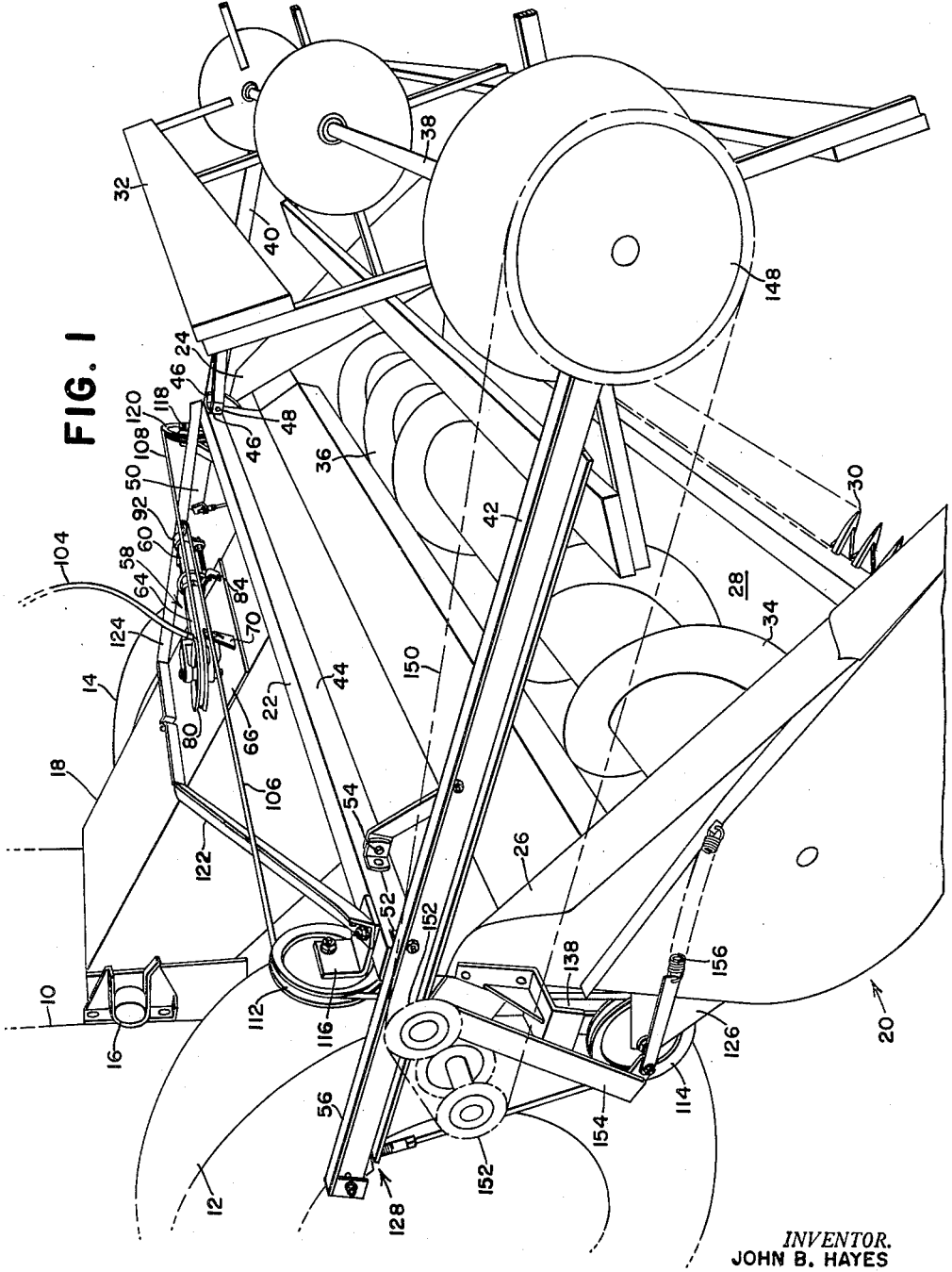
FIG. 1 is a fragmentary perspective of the front portion of a typical combine equipped with the improved reel mounting and adjusting means.

The harvester chosen for purposes of illustration is representative of a typical self-propelled combine, here illustrated as having a fore-and-aft body 10 supported on right and left hand traction wheels 12 and 14 and having attached thereto, as by suitable mounting means 16, the rear end of a forwardly extending feeder house or supporting structure 18. The forward end of the feeder house in turn supports a transverse header, indicated in its entirety by the numeral 20. This header is of substantial length measured transversely of the line of travel of the machine and has a rear wall 22, joined to the feeder house 18, and a pair of opposite end walls which may be regarded as first and second header ends 24 and 26. The portion of the header between the ends 24 and 26 and forwardly of the rear wall 22 is, as is conventional, in the form of a trough 28 into which material harvested by cutting mechanism 30 is moved rearwardly by a rotating reel 32 for ultimate transfer via oppositely directed augers 34 and 36 to a central portion of the header and thence into the feeder house 18 for transfer to the separator mechanism (not shown) conventionally contained in the combine body 10. The reel 32 is substantially coextensive in length with the platform or header 20 and is, as is typical, mounted on a transverse reel shaft 38 which has its right and left hand ends supported in any suitable manner on the fore parts of left and right or first and second supports or support arms 40 and 42.

The transverse rear wall 22 of the header is reinforced by a coextensive support in the form of an angle iron 44 and this support has at one end thereof a pair of laterally spaced apart brackets 46 which establish a transverse pivot 48 for an intermediate part of the left hand reel support arm 40. The rear part 50 of this arm projects rearwardly beyond the header wall 22 for purposes to be described later.

The other end of the header and associated support arm 42 are symmetrically arranged, the support 44 having at its right hand end a pair of laterally spaced apart brackets 52 which provide a transverse pivot 54 for mounting an intermediate part of the arm 42, a rear part 56 of the arm projecting rearwardly beyond the header wall 22 so as to be transversely alined with the rear part 50 of the left hand support arm 40. The pivots 48 and 54 are, of course, transversely coaxial. The two support arms are thus relatively widely spaced apart and serve to support the reel 32 as an adjustable part movable vertically, in this case relative to the cutting mechanism 30. In this adjustment, it is important that the reel be maintained level or parallel with the cutting mechanism, and for this purpose the two support arms 42 must initially be leveled and thereafter must be adjusted in unison and by equalizing means maintaining the level condition irrespective of the vertical position of the reel as a unit relative to the cutting mechanism. The reason for this are sufficiently well known to those versed in the art as to require no elaboration here.

The brackets 46 and 52 and pivots 48 and 54, together with the support arms 40 and 42, serve as means for mounting the adjustable part, here the reel 32, for vertical movement. The means for accomplishing adjustment of the reel arms 40 and 42 in unison will now be described.

This means takes the form of a fluid motor, indicated in its entirety by the numeral 58, comprising a cylinder-piston-piston rod assembly. This assembly is disposed with its major axis transverse to the length of the feeder house 18 and includes a cylinder 60 having its closed end 62 disposed toward the right or to the second support arm 42. The piston (not shown) is typically contained within the cylinder 60 and has attached thereto a piston rod 64 which projects from the open end of the cylinder toward the left or toward the first snupport arm 40. Mounting of the assembly 58 is preferably accomplished by a horizontal flat plate-like member 66, fastened to the top of the feeder house by any suitable means, as at 68, and the assembly is mounted on the plate by first and second mounting devices, the first of which includes a pair of upstanding apertured ears 70, welded to the plate as at 72, and straddling the closed end 62 of the cylinder. This device further includes a mounting member in the form of a removable pin 74 which extends not only through the closed end 62 of the cylinder but also through the collar 76 of a bracket 78 which in turn journals a sheave 80 on a shaft 82 that lies on an axis normal to the axis of the assembly 58. The second mounting device includes a bracket 84, welded at 86 to the plate 66, and a U bolt 88 which embraces the cylinder adjacent to its open end. The U bolt is secured to the bracket 84 in conventional fashion, as by nuts 90, as best seen in FIG. 4. The assembly may be readily removed from the plate by removal of the U bolt 88 and nuts 90 and pin 74.

The free end of the piston rod 64 is provided with an anchor head 92 which serves two purposes. Its first purpose is accomplished by the provision thereon of an integral depending ear 94 which is tapped to receive one end of a threaded adjusting rod 96 with which a jam nut 98 cooperates. The rod extends inwardly toward the bracket 84, the proximate portion of which is closed by an integral or welded-in plate 100 against which the end of the rod 96 may abut on the retracting stroke of the assembly 58. Release of the jam nut 98 and adjustment of the rod 96, which may be accomplished by the insertion of any appropriate tool through an aperture 102 in the end of the rod, will vary the point at which the piston stops moving on its retracting stroke, it being understood that the assembly 58 may be of the one-way type, supplied with fluid at the closed end of the cylinder 60 by a suitable fluid pressure line 104. Fluid under pressure may be supplied from any conventional pump or similar source on the machine, which pump is not shown, since it may be conventional and its presence as means for operating other equipment on the machine can readily be assumed. It will further be understood that the application of fluid under pressure to the closed end of the cylinder via the hose 104 will extend the assembly and in this case, as will be pointed out below, the result is that the reel 32 is raised. When fluid is exhausted from the cylinder via the hose 104, the fluid pressure behind the piston (not shown) is relieved and the reel lowers by its own weight.

The second purpose served by the piston rod head 92 is the anchoring of the end of each of two cables or equivalent flexible elements 106 and 108, which is accomplished by a clamp and cap screw assembly 110, which is representative of several means by which the ends of the cables can be attached to the piston rod. The cables extend in opposite directions to the support arms 40 and 42 and include means, to be described below, for exerting simultaneous forces on these arms to rock same about their respective pivots 48 and 54 so as to accomplish vertical adjustment of the reel. In the arrangement shown, extension of the assembly 58, as pointed out above, serves to elevate the reel, and retraction of the assembly lowers the reel.

The cable 106 extends to the right for ultimate association with the right hand arm 42 and right hand end 26 of the header 20 to serve as means whereby the cable may act and react on these two parts for vertically adjusting or rocking the arm 42. The cable 108 extends to the left and is similarly associated with the header end and arm 40 thereat. The guide and mounting means for the right hand end of the cable 106 includes a right hand guide device having upper and lower guides in the form of sheaves 112 and 114, respectively. The sheave 112 is suitably rotatably mounted on a bracket 116 on the right hand end of the rear wall support angle 44, and a similar bracket 118 at the opposite end of the angle 44 mounts a sheave 120 similar to the sheave 112. In addition, the feeder house 18 is braced to these brackets 116 and 118 by a pair of appropriate braces 122 and 124 so as to reinforce the header wall 22 and its connection to the feeder house against tensional forces exerted through the cables 106 and 108 as will be explained below.

The lower sheave 114 at the right hand end 26 of the header 20 is journaled on an appropriate bracket 126 which is secured to the rear wall 22 at a level below the bracket 116. The sheave 112 rotates about a fore-and-aft axis and the sleeve 114 rotates about a transverse axis. The cable 106 is trained voer the sheave 112 and under the sheave 114, and its free end is dead-ended by an anchor device 128 to the rear part 56 of the arm 42. The connection 128 includes provision for adjustment so that the length of cable between the sheave 114 and the rear part 56 of the arm may be adjusted as to length, which is significant from the standpoint of leveling the arm 42 relative to the arm 40, the connection of the cable to which includes a similar connection or anchor device 130 (FIG. 3) after the cable 108 passes around the cylinder sheave 80 and is reversed to be trained over the sheave 120 an ddown under a lower sheave 132 carried by the left hand end 24 of the header 20 by means of a suitable bracket 134. The sheave 120 is rotatable about a fore-and-aft axis and the sheave 132 is rotatable about a transverse axis. As best seen in FIG. 3, a vertical or upright brace 136 spans the mountings for the left hand guide device comprising the sheaves 120 and 132 and acts in compression between these two to brace the sheave mountings against tensional forces exerted by the runs of the cable 108. Similar bracing, barely visible at 138, is used between the right hand sheaves 112 and 114.

For the purpose of explaining the type of connection used at 128 and 130, reference will be had to FIG. 3 as typical of the two. As seen there, a clip 140 is secured to the rear end of the arm part 50 and is apertured to receive a threaded member 142 which is rigidly secured to the end of the cable 108 as a coaxial extension thereof. The process by means of which the member 142 is secured to the cable includes the formation on the unthreaded portion of the member 142 of a tool-receiving end 144. Hence, the jam nuts 146 with which the threaded member 142 cooperates, may be loosened and a suitable tool applied to the portion 144 for holding the member while the positions of the nuts 146 are changed. This will result in variation of the distance between the end 50 and the sheave 132 and consequently will level the arm 40 relative to the other arm 42, thereby assuring that the reel will be initially leveled relative to the cutting mechanism 30. Once this adjustment is made, it will normally not be necessary to change it except to compensate for stretching of the cables, assembly and disassembly of the adjusting components etc. In any event, this adjustment may be made independently of the motor 58. Another form of adjustment exists in the connection of the cables to the piston end cap 92, which is accomplished by loosening the cap screw 110 and changing the position of one or the other or of both of the cables, the reel being suitably supported in the meantime so as to relieve the load thereof on the cables.

Since lowering of the reel is accomplished by retraction of the motor 58, the adjustable means 96—100 is effective to establish a limit on the lowermost position of the reel. In other words, a lowered position of the reel having the desired relationship to the cutting mechanism may be accomplished and a simple exhaust of fluid from the motor 58 will result in lowering of the reel to that position. As indicated, the stop means may be adjusted so as to vary the point at which the reel will be stopped in its downward movement. Normally, elevation of the reel to the extent permitted by the permissible stroke of the motor 58 is not undesirable. Of course, the valve (not shown) controlling the supply and exhaust of fluid through the conduit or hose 104 may be closed at any time to hold the reel in a position above that determined by its maximum lowered position as set by the stop means 96—100.

As indicated, the design is such that it may be provided as attachments for machines already in existence or may be furnished as original equipment with new machines. It is simple in construction, easy to adjust and maintain and, what is more significant, the arrangement of cables provides for the equalization of movement of the reel support arms 40 and 42 so that once they are leveled they will remain level regardless of the vertical position of the reel relative to the cutting mechanism.

By way of explanation of components illustrated schematically in the drawing primarily for the purposes of completing the environment of the invention, the numeral 148 represents a sprocket coaxially secured to the reel shaft 38 and by means of which the reel may be driven as by a chain 150 from a suitable source on the machine. Additional sprockets are shown at 152, one of which is an idler carried by an arm 154 spring loaded at 156. In FIG. 3, the numeral 158 designates a shaft which ultimately drives the cutting mechanism and which initially has its source of drive from any appropriate driving mechanism on the machine. These parts are largely immaterial to the present invention but, as explained, have been illustrated in connection with the overall picture of the machine.

Features and advantages of the invention, other than those enumerated herein, will readily occur to those versed in the art, as will many modifications and alterations in the preferred embodiment set forth, all of which may be achieved without departure from the spirit and scope of the invention.

What is claimed is:

1. For a harvester having a body including a fore-and-aft feeder house, a transverse header forwardly of and attached to the feeder house and having opposite first and second ends laterally remote from the feeder house, and a reel rotatable above the header on a transverse axis, the improvement residing in mechanism for mounting and adjusting the reel, comprising: first and second fore-and-aft support arms respectively at said first and second header ends, each arm including a fore part mounting the proximate end of the reel, a rear part behind the header and an intermediate part mounted on the associated header end on a transverse pivot; a fluid motor mounted on the feeder house behind the header and including a cylinder-piston-rod assembly having its axis transverse to the feeder house and disposed with the free end of the rod toward the first arm rear part and the closed end of the cylinder toward the second arm rear part; a sheave; means journaling the sheave adjacent to the closed end of the cylinder on an axis normal to said assembly axis; a first flexible tension element connected at one end to the piston rod and extending along one side of said assembly to an opposite end portion proximate to said second header end; a second flexible tension element connected at one end to said piston rod and extending along the other side of said assembly to and trained about the sheave and extending thence back along said one side of said assembly to an opposite end portion proximate to said first end of the header; first and second establishing connections among means guiding and mounting said first and second element end portions, said first and second header ends and said first and second arm rear parts so that extension and retraction of the cylinder-piston-rod assembly causes the flexible elements to act and react on said rear arm parts and header ends to effect equalized rocking of the arms in unison on their respective pivots, each guide and mounting means including an anchor device for the end portion of the associated element and a guide device for training and directing said element between said anchor device and said assembly, one of said devices being mounted on the rear part of the associated arm and the other of said devices being mounted on the associated end of the header.

2. The invention defined in claim 1, including: adjustable means in at least one of the guide and mounting means for adjusting the relationship between the associated flexible element and the associated support arm to selectively pivot said arm on its pivot relative to the other arm.

3. The invention defined in claim 1, including: stop means selectively adjustable between the cylinder and piston rod to limit retraction of the piston relative to the cylinder and thereby to limit rocking of the support arms in at least one direction.

4. The invention defined in claim 1, in which: the fluid motor is mounted on the feeder house by means including a plate secured to the feeder house, a first mounting device secured to the plate and to the cylinder adjacent to the sheave, and a second mounting device secured to the plate and connected to the cylinder adjacent to its opposite end.

5. The invention defined in claim 4, in which: the first mounting device includes a member secured to the plate and a removable connector between said member and the cylinder, and the sheave includes a support connected to the cylinder by said connector.

6. For a harvester having fore-and-aft supporting structure, a transverse header forwardly of and attached to the structure and having opposite first and second ends laterally remote from the structure, and a reel rotatable above the header on a transverse axis, the improvement residing in mechanism for mounting and adjusting the reel, comprising: first and second fore-and-aft support arms respectively at said first and second header ends, each arm including a fore part mounting the proximate end of the reel, a rear part behind the header and an intermediate part mounted on the associated header end on a transverse pivot; a fluid motor mounted on the supporting structure behind the header and including a transverse cylinder-piston-rod assembly disposed with the free end of the rod toward the first arm rear part and the closed end of the cylinder toward the second arm rear part; a sheave; means journaling the sheave adjacent to the closed end of the cylinder on an axis normal to said assembly axis; a first flexible tension element connected at one end to the piston rod and extending along one side of said assembly to an opposite end portion proximate to said second header end; a second flexible tension element connected at one end to said piston rod and extending along the other side of said assembly to and trained about the sheave and extending thence back along said one side of said assembly to an opposite end portion proximate to said first end of the header; first and second guide and mounting means establishing connections among said first and second element end portions, said first and second header ends and first and second arm rear parts so that extension and reaction of the cylinder-piston-rod assembly causes the flexible elements to act and react on said rear arm parts and header ends to effect equalized rocking of the arms in unison on their respective pivots, each guide and mounting means including an anchor device for the end portion of the associated element and a guide device for training and directing said element between said anchor device and said assembly, one of said devices being mounted on the rear part of the associated arm and the other of said devices being mounted on the associated end of the header.

7. For a harvester having a body including a fore-and-aft feeder house, a transverse header forwardly of and attached to the feeder house and having opposite first and second ends laterally remote from the feeder house, and a reel rotatable above the header on a transverse axis, the improvement residing in mechanism for mounting and adjusting the reel, comprising: first and second fore-and-aft support arms pivoted respectively on said first and second header ends on transverse pivots and mounting the proximate ends of the reel; a fluid motor mounted on the feeder house and including a cylinder-piston-rod assembly disposed with the free end of the rod toward the first arm and the closed end of the cylinder toward the second arm; a sheave; means journaling the sheave adjacent to the closed end of the cylinder on an axis normal to said assembly axis; a first flexible tension element connected at one end to the piston rod and extending along one side of said assembly to an opposite end portion proximate to said second header end; a second flexible tension element connected at one end to said piston rod and extending along the other side of said assembly to and trained about the sheave and extending thence back along said one side of said assembly to an opposite end portion proximate to said first end of the header; first and second guide and mounting means element end portions, said first and second header ends and first and second arms so that extension and retraction of the cylinder-piston-rod assembly causes the flexible elements to act and react on said arms and header ends to effect equalized rocking of the arms in unison on their respective pivots, each guide and mounting means including an anchor device for the end portion of the associated element and a guide device for training and directing said element between said anchor device and said assembly, one of said devices being mounted on the rear part of the associated arm and the other of said devices being mounted on the associated end of the header.

8. For a harvester having fore-and-aft supporting structure, a transverse header forwardly of and attached to the structure and having opposite first and second ends laterally remote from the structure and a reel rotatable above the header on a transverse axis, the improvement residing in mechanism for mounting and adjusting the reel comprising: first and second fore-and-aft support arms pivoted respectively on said first and second header ends on transverse pivots and mounting the proximate ends of the reel; a fluid motor mounted on the supporting structure and including a transverse cylinder-piston-rod assembly disposed with the free end of the rod toward the first arm and the closed end of the cylinder toward the second arm; a sheave; means journaling the sheave adjacent to the closed end of the cylinder to an axis normal to said assembly axis; a first flexible tension element connected at one end to the piston rod and extending along one side of said assembly to an opposite end portion proximate to said second header end; a second flexible tension element connected at one end to said piston rod and extending along the other side of said assembly to and trained about the sheave and extending thence back along said one side of said assembly to an opposite end portion proximate to said first end of the header; first and second guide and mounting means establishing connections among said first and second element end portions, said first and second header ends and first and second arms so that extension and retraction of the cylinder-piston-rod assembly causes the flexible elements to act and react on said arms and header ends to effect equalized rocking of the arms in unison on their respective pivot, each guide and mounting means including an anchor device for the end portion of the associated element and aguide device for training directing said element between said anchor device and said assembly, one of said devices being mounted on the rear part of the associated arm and the other of said devices being mounted on the associated end of the header.

9. For a harvester having fore-and-aft supporting structure and a vertically adjustable part carried by said structure by means of first and second relatively widely spaced supports pivoted to said structure on transversely coaxial pivots, the improvement residing in mechanism for effecting equalized rocking of said supports in unison on said pivots, comprising: a fluid motor mounted on said structure and including a cylinder-piston-rod assembly having its axis transverse and disposed with the free end of the rod toward the first support and the closed end of the cylinder toward the second support; a sheave; means journaling the sheave adjacent to the closed end of the cylinder on an axis transverse to the assembly axis; a first flexible element connected at one end to the piston rod and extending along one side of said assembly to an opposite end portion proximate to the second support; a second flexible element connected to the piston rod and extending along the other side of said assembly to and trained about the sheave and extending thence back along said one side of said assembly to an opposite end portion proximate the first support; and first and second guide and mounting means establishing connections among the end portions of the elements, the supports and the supporting structure so that extension and retraction of said assembly causes the elements to act and react on the supports and supporting structure for effecting equalized rocking of the supports in unison about their respective pivots, each guide and mounting means including an anchor device for the end portion of the associated element and a guide device for training and directing said element between said anchor device and said assembly, one of said devices being mounted on the associated support and the other of said devices being mounted on the supporting structure.

10. For a harvester having fore-and-aft supporting structure and a vertically adjustable part carried by said structure by means of first and second relatively widely spaced supports vertically movable carried on said structure, the improvement residing in mechanism for effecting equalized rocking of said supports in unison on said pivots, comprising: a fluid motor mounted on said structure and including a cylinder-piston-rod assembly having its axis transverse and disposed with the free end of the rod toward the first support and the closed end of the cylinder toward the second support; a sheave; means journaling the sheave adjacent to the closed end of the cylinder on an axis transverse to the assembly axis; a first flexible element connected at one end to the piston rod and extending along one side of said assembly to an opposite end portion proximate to the second support; a second flexible element connected to the piston rod and extending along the other side of said assembly to and trained about the sheave and extending thence back along said one side of said assembly to an opposite end portion proximate the first support; and first and second guide and mounting means establishing connections among the end portions of the elements, the supports and supporting structure so that extension and retraction of said assembly causes the elements to act and react on the supports and supporting structure for effecting equalized vertical movement of the supports in unison, each guide and mounting means including an anchor device for the end portion of the associated element and a guide device for training and directing said element between said anchor device and said assembly, one of said devices being mounted on the associated support and the other of said devices being mounted on the supporting structure.

11. The invention defined in claim 10, including: adjustable means in at least one of the guide and mounting means for adjusting the relationship between the associated flexible element and the associated support to selectively move said support vertically relative to the other support.

References Cited in the file of this patent

UNITED STATES PATENTS

| | | |
|---|---|---|
| 1,888,507 | Johnston et al. | Nov. 22, 1932 |
| 2,265,412 | Worrell | Dec. 9, 1941 |
| 2,701,945 | Richardson et al. | Feb. 15, 1955 |
| 2,777,373 | Pursche | Jan. 15, 1957 |
| 2,808,695 | Rowbotham | Oct. 8, 1957 |
| 2,815,141 | Birch | Dec. 3, 1957 |

UNITED STATES PATENT OFFICE

CERTIFICATE OF CORRECTION

Patent No. 3,030,758                         April 24, 1962

John B. Hayes

It is hereby certified that error appears in the above numbered patent requiring correction and that the said Letters Patent should read as corrected below.

Column 5, line 48, after "second" insert -- guide and mounting means --; lines 48 and 49, strike out "means guiding and mounting"; column 7, line 3, before "element" insert -- establishing connections among said first and second --; line 30, for "to", second occurrence, read -- on --; line 47, for "pivot" read -- pivots --; same column 7, line 49, for "aguide" read -- a guide --.

Signed and sealed this 11th day of September 1962.

SEAL)
ttest:

:NEST W. SWIDER
ttesting Officer

DAVID L. LADD
Commissioner of Patents